T. POWELL.
Hay and Grain Elevator.
No. 162,307.                                    Patented April 20, 1875.
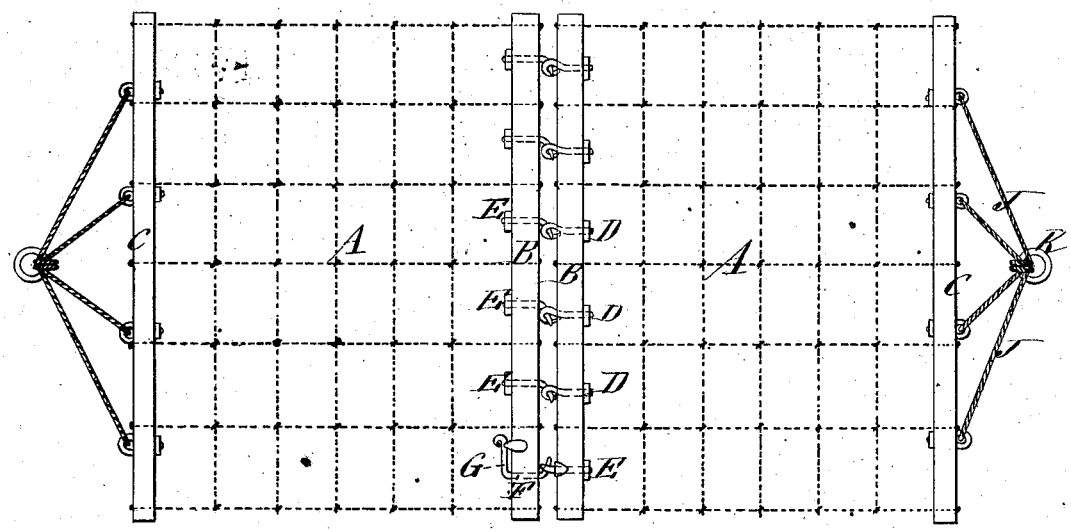
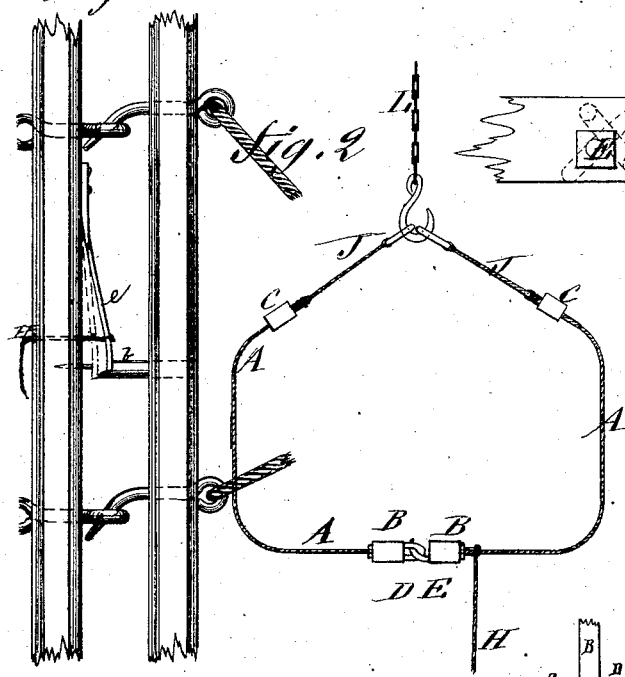
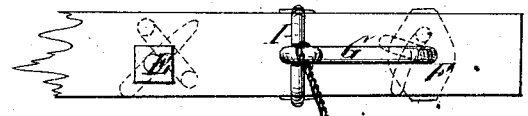
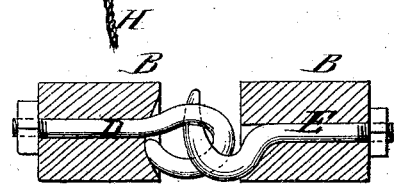
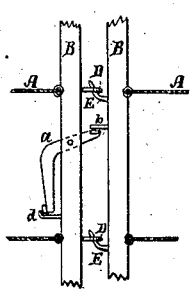
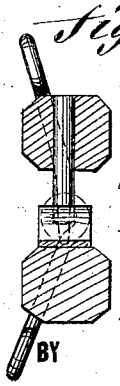
WITNESSES:                                      INVENTOR:

UNITED STATES PATENT OFFICE.

THOMAS POWELL, OF STOCKTON, CALIFORNIA.

IMPROVEMENT IN HAY AND GRAIN ELEVATORS.

Specification forming part of Letters Patent No. 162,307, dated April 20, 1875; application filed September 26, 1874.

*To all whom it may concern:*

Be it known that I, THOMAS POWELL, of Stockton, in the county of San Joaquin and State of California, have invented a new and Improved Hay and Grain Unloader, of which the following is a specification:

The invention will first be fully described, and then pointed out in the claim.

Figure 1 is a plan view of my improved unloading-sling as when spread out for receiving the load. Fig. 2 is a side view of the sling as when suspended by the derrick. Fig. 3 is a side elevation of one of the stretcher-bars, by which the two parts are hooked together; and Fig. 4 is a cross-section of the said stretcher-bars. Fig. 5 is a detail, showing the bell-crank locking device; and Fig. 6 is a detail, showing a spring locking device.

Similar letters of reference indicate corresponding parts.

A represents two sections of netting, canvas, leather, or other material suitable for a kind of sling, by which to elevate hay or the short straw, heads, and grain from the header-wagon, the netting or canvas being attached to stretchers of wood B and C. The stretchers B connect the sections together by the hooks E and eyes D; also, by the revolving hook F, when that form of locking device is to be used, the hooks E being arranged so as to escape easily from the eyes when not fastened or locked in them, and the hook F being arranged to revolve and swing into a hook, E, in place of one of the eyes, after the other hooks have engaged the eyes, and, by engaging in a contrary way to the other hooks, locking the two sections together, so that they cannot disconnect until released. The hook F has a crank, G, for turning it by a trip-cord, H, for unlocking the sling. This crank is held fast by a spring-catch, I, until it is required to unlock it.

Instead of the revolving hook a bell-crank, *a*, may be used, acting on the stud *b*, and having a spring-catch, *d*, for holding it, said catch having the trip cord connected to it for releasing the crank when the sling is to be unfastened; and, instead of either, a spring-catch, *e*, may be used with the stud *b*. The stretchers C have cords J connected to them, which center in a ring, K, by which the sling is hooked onto the chain L of a hoisting-derrick of any suitable kind.

The sling will be spread upon the bed of the wagon to be loaded, with the ends so disposed that they can be connected to the derrick-hook, in the manner indicated in Fig. 2, when the load is to be removed. After the load is removed and laid on the stack the two parts of the sling will be unlocked by the trip-cord H, so as to disconnect and pull out from under the load, and leave it when the derrick-chain is hoisted.

Having thus described my invention, what I claim as new, and desire to secure by Letters Patent, is—

The sections A A, provided with hooks and eyes D E and swivel-hook F, having crank G, catch I, and trip-cord H, all arranged as shown and described.

THOMAS POWELL.

Witnesses:
 W. J. WILLIS,
 H. DAVIS.